(12) United States Patent
Huang et al.

(10) Patent No.: US 9,420,258 B1
(45) Date of Patent: Aug. 16, 2016

(54) STREAMING-TIME 3D METADATA INJECTION

(75) Inventors: Jonathan Huang, Cupertino, CA (US); Andrew D. Berkheimer, Boston, MA (US); Peter Bradshaw, San Francisco, CA (US); Ben Hayden, Somerville, MA (US)

(73) Assignee: Google Inc., Mountain View, CA (US)

( * ) Notice: Subject to any disclaimer, the term of this patent is extended or adjusted under 35 U.S.C. 154(b) by 577 days.

(21) Appl. No.: 13/367,169

(22) Filed: Feb. 6, 2012

Related U.S. Application Data

(60) Provisional application No. 61/440,211, filed on Feb. 7, 2011.

(51) Int. Cl.
*H04N 13/00* (2006.01)

(52) U.S. Cl.
CPC ....... *H04N 13/0048* (2013.01); *H04N 13/0059* (2013.01)

(58) Field of Classification Search
CPC .......... H04N 13/0062; H04N 13/0066; H04N 21/4348
USPC ................................................ 348/42, 43, 46
See application file for complete search history.

(56) References Cited

U.S. PATENT DOCUMENTS

| | | | | |
|---|---|---|---|---|
| 2006/0221178 | A1* | 10/2006 | Yun | H04N 7/17318 348/42 |
| 2008/0279449 | A1* | 11/2008 | Ramstad | H04N 13/0431 382/154 |
| 2010/0158098 | A1* | 6/2010 | McSchooler et al. | 375/240.01 |
| 2010/0174608 | A1* | 7/2010 | Harkness et al. | 705/14.53 |
| 2010/0289872 | A1* | 11/2010 | Funabiki | G09G 3/003 348/43 |
| 2010/0329640 | A1* | 12/2010 | Okada | G11B 20/00086 386/252 |
| 2012/0120200 | A1* | 5/2012 | Newton et al. | 348/46 |

OTHER PUBLICATIONS

YouTube, Inc., "Most Subscribed Channels (All Time)," Archived on Web.archive.org on Sep. 3, 2006, 1 Page [online] [retrieved on May 7, 2013] Retrieved from the internet <URL:http://web.archive.org/web/20060903035149/http://www.youtube.com/members?s=ms&t=a&g=0>.

* cited by examiner

*Primary Examiner* — Sath V Perungavoor
*Assistant Examiner* — Clifford Hilaire
(74) *Attorney, Agent, or Firm* — Fenwick & West LLP

(57) ABSTRACT

Injection of 3D metadata into a requested video is disclosed. An input video and associated metadata are received by a video hosting site. If the metadata indicates that the input video is a 3D video, the 3D video system extracts the accompanying 3D metadata and stores it in an intermediate format, which is independent of the 3D metadata format and video format of the input video. The 3D video system stores the received video in a standard 2D video format in a video database. Responsive to a video streaming request of the input video, the 3D video system determines the actual 3D metadata format based on the video format of the requested video, and injects a modified 3D metadata associated with the input video into the requested video.

9 Claims, 3 Drawing Sheets

STREAMING-TIME 3D METADATA INJECTION

CROSS-REFERENCE TO RELATED APPLICATIONS

This application claims the benefit of U.S. Provisional Patent Application No. 61/440,211, filed on Feb. 7, 2011, which is incorporated by reference in its entirety.

BACKGROUND

1. Field of Art

The disclosure generally relates to video compression, and more particularly to dynamically injecting three-dimensional (3D) metadata into 3D videos during video streaming.

2. Description of the Related Art

As three-dimensional (3D) TVs become more popular with consumers, more 3D videos are uploaded, streamed and played back by users. The decoder of a 3D video player uses metadata received with the video to determine the frame packing arrangement (or "FPA"; also known as "3D frame packing format") and video format that the 3D video is encoded. Frame packing refers to the combination of two individual frames into a single "packed" frame.

One format of frame packing is left-and-right 3D format (also called side-by-side 3D format). As known by those of skill in the art, a video frame of a 3D video in the left-right 3D format consists of a single frame that combines a left sub-frame for the left eye of a viewer and a right sub-frame for the right eye of the viewer. When a 3D video player receives a left-and-right 3D frame, it splits the frame into its left and right sub-frames. If the left and right sub-frames are in a resolution smaller than the display dimensions of the video player, the 3D video player upscales the left and right sub-frames to the display dimensions of the video player and displays the upscaled frames in sequence to achieve the 3D effect.

Another frame packing format is top-and-bottom 3D format, which is similar to the left-and-right 3D format described above. Unlike the left-and-right 3D format, two sub-frames being combined are stacked vertically with the sub-frame for the left eye stacked above the sub-frame for the right eye.

To properly display a 3D video, the decoder in the display device needs to be aware of the FPA used to encode the video. Existing 3D encoders may include 3D metadata associated with a 3D video at video encoding time. Video formats such as H.264, Matroska, and Stereoscopic Video AF Player (SVAF) assume that a video encoder creates a video container at video encoding time with 3D metadata present. This technique requires re-encoding the 3D video responsive to 3D metadata modification. Repeatedly re-encoding a 3D video responsive to 3D metadata manipulation is costly in terms of system performance.

SUMMARY

The embodiments of the invention may include systems, methods and computer readable storage media. In one embodiment, when an input video is received by a video hosting site, associated metadata is received along with the input video. If the metadata indicates that the input video is a 3D video, a 3D video system extracts the accompanying 3D metadata and stores it in an intermediate format, which is independent from the 3D metadata format and video format of the input video. Alternatively, the content provider or video hosting site operator may update metadata regarding a video previously received and identified as being a 2D video to indicate that it is in fact a 3D video. Again, the 3D metadata is then stored in an intermediate format. The 3D video system stores the received video in a standard 2D video format in a video database.

Responsive to a user request for streaming a video, the 3D video system loads the 3D metadata in intermediate format from the 3D video database and sends to one or more of the video streaming servers for processing or processes the metadata locally. The video streaming servers or the 3D video system determines the actual 3D metadata format based on the video format of the requested video, and injects the requested metadata into the requested video.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

DETAILED DESCRIPTION

The Figures and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architectural Overview

Figure 1:
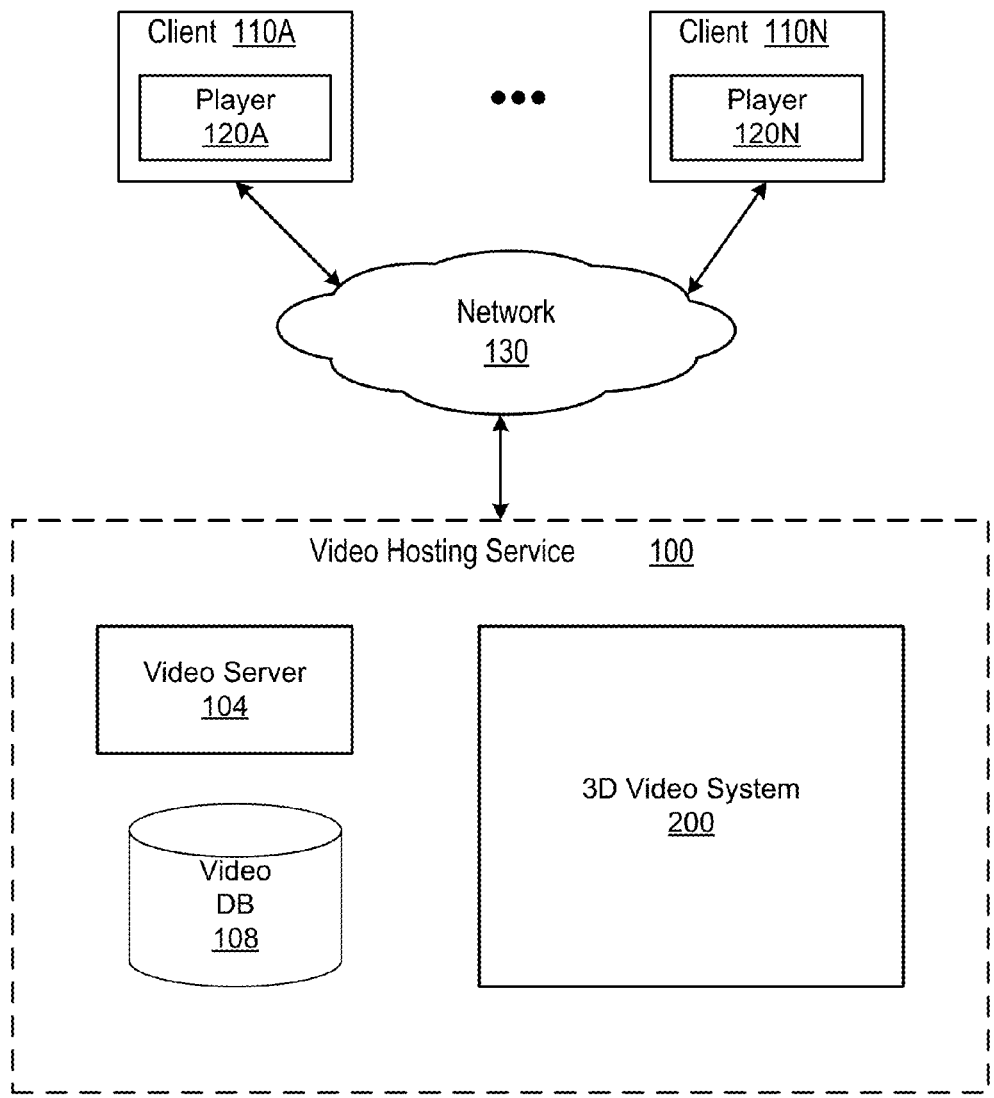
FIG. 1 is a block diagram illustrating a system view of a video hosting service having a 3D video system according to one embodiment of the invention.

FIG. 1 is a block diagram illustrating a system view of a video hosting service 100 having a 3D video system 200. Multiple users/viewers use client 110A-N to send video hosting requests to the video hosting service 100, such as uploading videos to a video hosting website, and receive the requested services from the video hosting service 100. The video hosting service 100 communicates with one or more clients 110A-N via a network 130. The video hosting service 100 receives the video hosting service requests from clients 110A-N, processes source videos by the 3D videos system 200 and returns the processed source videos to the clients 110A-N.

Turning to the individual entities illustrated on FIG. 1, each client 110 is used by a user to request video hosting services. For example, a user uses a client 110 to send a request for uploading a video for sharing, or playing a video. The client 110 can be any type of computer device, such as a personal computer (e.g., desktop, notebook, laptop) computer, as well as devices such as a mobile telephone, personal digital assistant, IP enabled video player. The client 110 typically includes a processor, a display device (or output to a display device), a local storage, such as a hard drive or flash memory device, to which the client 110 stores data used by the user in performing tasks, and a network interface for coupling to the system 100 via the network 130.

A client 110 also has a video player 120 (e.g., the Flash™ player from Adobe Systems, Inc., or a proprietary one) for playing a video stream. The video player 120 may be a standalone application, or a plug-in to another application such as a network browser. Where the client 110 is a general purpose device (e.g., a desktop computer, mobile phone), the player 120 is typically implemented as software executed by the computer. Where the client 110 is dedicated device (e.g., a dedicated video player), the player 120 may be implemented in hardware, or a combination of hardware and software. All of these implementations are functionally equivalent in regards to the present invention. The player 120 includes user interface controls (and corresponding application programming interfaces) for selecting a video feed, starting, stopping, and rewinding a video feed. Also, the player 120 can include in its user interface a video display format selection configured to indicate which video display format (e.g., a standard definition TV or a high-definition TV). Other types of user interface controls (e.g., buttons, keyboard controls) can be used as well to control the playback and video format selection functionality of the player 120.

The network 130 enables communications between the clients 110 and the video hosting service 100. In one embodiment, the network 130 is the Internet, and uses standardized internetworking communications technologies and protocols, known now or subsequently developed that enable the clients 110 to communicate with the video hosting service 100. In another embodiment, the network 130 is a cloud computing network and includes one or more components of the video hosting service 100.

The video hosting service 100 comprises a 3D video system 200, a video server 104 and a video database 108. The video server 104 receives user uploaded videos and stores the videos in the video database 108. The video server 104 also serves the videos from the video database 108 in response to user video hosting service requests. The video database 108 stores user uploaded videos and videos processed by the 3D video system 200. The 3D video system 200 receives a 3D input video, determines the metadata of the 3D input video and injects the metadata into the 3D video upon a user request for streaming the 3D video.

3D Video System

Figure 2:
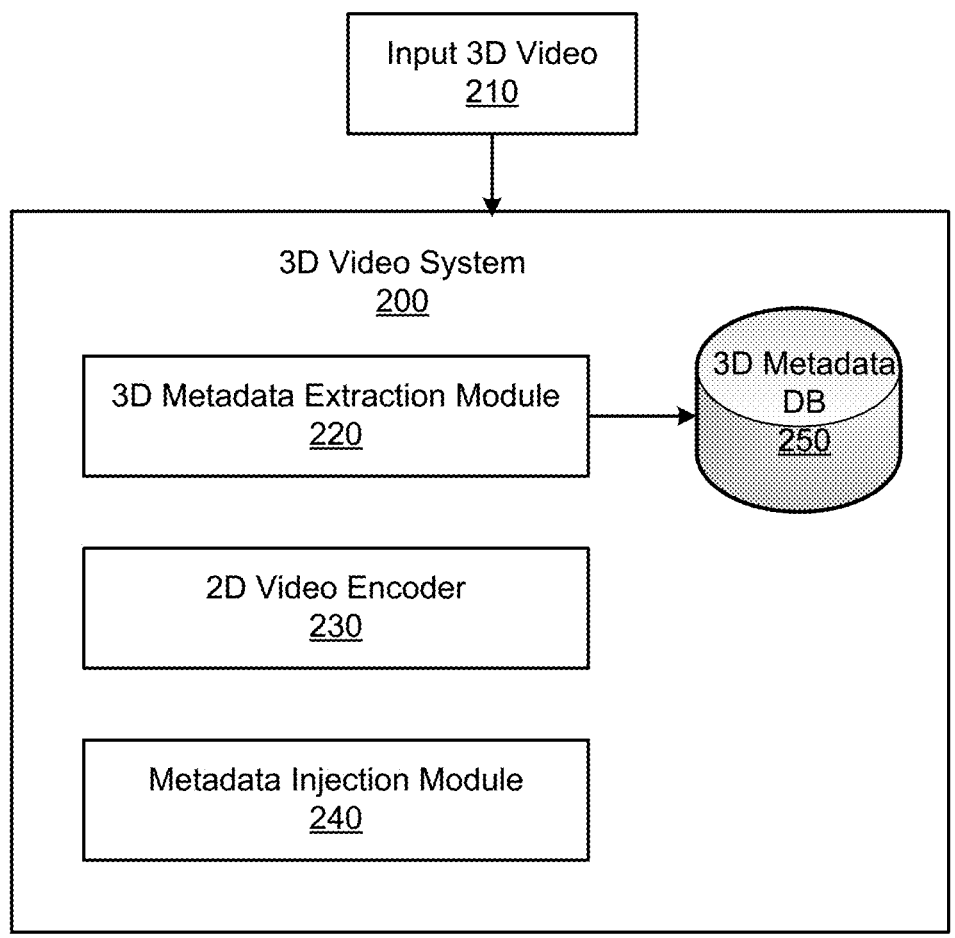
FIG. 2 is an example 3D video system that is capable of injecting 3D metadata into 3D videos at video streaming according to one embodiment of the invention.

FIG. 2 is an example 3D video system 200 that is capable of injecting 3D metadata into 3D videos at video streaming according to one embodiment of the invention. In the embodiment illustrated in FIG. 2, the 3D video system 200 comprises a 3D metadata extraction module 220, a 2D video encoder 230, a metadata injection module 240 and a 3D metadata database 250. The 3D video system 200 receives an input 3D video 210 and processes the input video 210 such that the 3D video system 200 can inject the 3D metadata into the input video 210 when requested for streaming at run time.

In one embodiment, the input 3D video 210 contains 3D metadata. The 3D metadata of the input 3D video 210 specifies the manner of the video frames of the input video 210 being packed (e.g., left-and-right or top- and down) and video format of the input video 210 being encoded. For example, 3D metadata may include information used to display video scene, such as frame packing format (e.g., left-right, or top-down), frame distance between a viewer's eyes (e.g., 5 mm), configurable convergence settings (e.g., +5, −10), or general information such as the camera settings used to capture the video scene. The input 3D video 210 can be in any video format. A 3D video format is typically a 2D video format with 3D specific metadata. The 3D specific metadata describes how to display a 2D video as a 3D video. The 3D metadata of the input video 210 may be part of the video content, or provided as video parameters by the source of the input 3D video 210. The 3D metadata extraction module 220 extracts the 3D metadata from the input 3D video 210 and stores the extracted 3D metadata in an intermediate format in the metadata database 250. The intermediate format is independent of the input file and video format of the input 3D video. In one embodiment, the intermediate format describes common settings in a variety of existing 3D video formats (e.g., frame packing arrangements, convergence). An example of an intermediate format is Google Protocol Buffers, an extensible data structure encoding format available from Google Inc. of Mountain View, Calif. Another example intermediate format is XML for storing the 3D metadata. The 3D metadata extraction module 220 stores the input 3D video 210 in a standard 2D format (e.g., H.264, MPEG4).

In another embodiment, the input 3D video 210 does not contain 3D metadata. The 3D video system 200 notifies the source of the input 3D video to edit the settings of the input 3D video 210, or modify a setting of the input 3D video to indicate that the input video is 3D and how to encode the input video 210 (e.g., 3D metadata format and video format). The 3D metadata extraction module 220 stores the settings of the input 3D video 210 as 3D metadata in a customer intermediate format in the metadata database 250. The 3D metadata extraction module 220 stores the input video 210 in a standard 2D format.

In yet another embodiment, the 3D metadata extraction module 220 analyzes the input 3D video 210 to determine the 3D metadata format and video format and saves the formats associated with the identification of the input 3D video 210 into the metadata database 250. In response to a user changing the metadata of the input 3D video 210 (e.g., from left-to-right to right-to-left), the 3D metadata extraction module 220 updates the 3D metadata associated with the input 3D video in the metadata database 250.

The 2D video encoder 230 encodes the input 3D video 210. An input 3D video without metadata is encoded as a regular 2D video using any existing 2D video coding standards, such as H.264, H.264/AVC, MPEG-4, VP8 used in WebM-3D and JPEG2000. WebM-3D is a combination of a WebM container, VP8 video format and StereoMode setting. An example of the WedM-3D specification, including the StereoMode setting, can be found at www.webmproject.org/code/specs/container/#webm_guidelines. In one embodiment, the 2D video encoder 230 comprises standard video coding components, such as discrete cosine transformation (DCT), quantization, in-loop filtering and entropy encoding, which are known to those of ordinary skills in the art.

The metadata injection module 240 dynamically injects 3D metadata into a 3D video requested for streaming at runtime. Specifically, when a user requests a 3D video, the injection module 240 queries the metadata database 250 for the metadata associated with the requested video. The injection module 240 also determines the actual 3D metadata format (e.g., H.264, SEI FPA, WebM-3D) from the video format of the requested video by analyzing the video format and/or scanning the video content. The injection module 240 extracts and analyzes the video format of the requested video. It identifies the actual 3D metadata format of the requested video, a format corresponding to the video format of the requested video. For example, if the requested video is a 3D video supported by the H.264 video format, the injection module 240 determines that the actual 3D metadata of the requested video to be injected into the requested video is H.264 SEI FPA. The injection module 240 modifies the retrieved metadata in the intermediate data format to the actual 3D metadata format and generates a data packet containing the requested metadata. The injection module 240 inserts the data packet into the video stream of the requested 3D video. In one embodiment, the injection module 240 injects the metadata packet at the beginning of the video stream such that the requested 3D video can be correctly displayed for the 3D visual effect according to the 3D metadata.

In another embodiment, the injection module 240 is located with the video streaming servers. In response to a user request for streaming a requested video, the injection module 240 interacts with the 3D video system 200 to retrieve the metadata in the intermediate format, modifies the metadata into the actual requested 3D metadata format and injects the 3D metadata into the requested videos stream.

Figure 3:
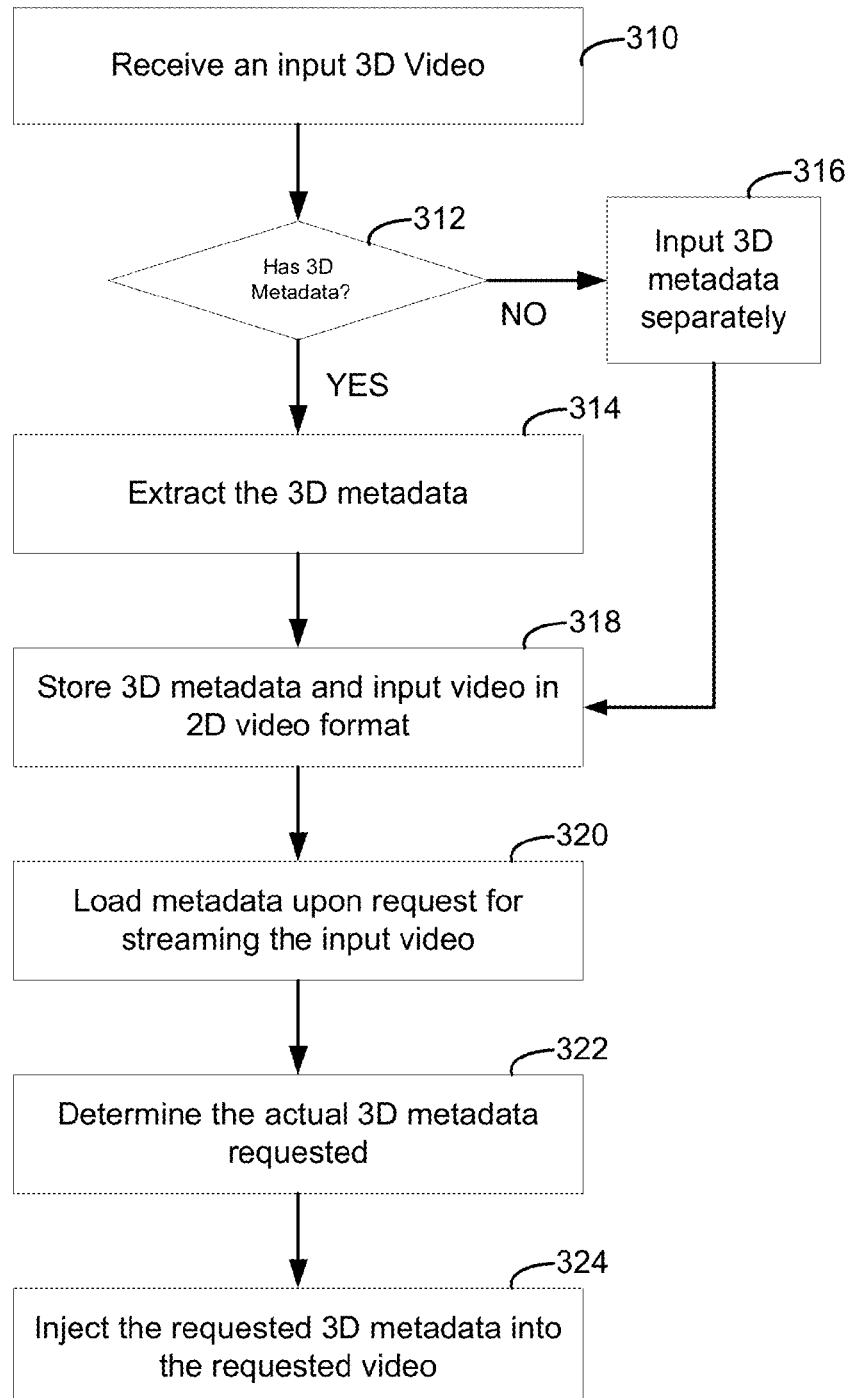
FIG. 3 is a flow chart of injecting 3D metadata of 3D videos while streaming the 3D videos according to one embodiment of invention.

FIG. 3 is a flow chart of injecting 3D metadata into a 3D video at video streaming according to one embodiment of the invention. Initially, the 3D video system 200 receives 310 an input 3D video and determines 312 whether the input video has 3D metadata. In response to the input video having metadata, the 3D video system 200 extracts 314 the 3D metadata. In response to the determination that the input video does not contain metadata, the 3D video system 200 instructs the source of the input video to edit or modify the video settings of the input video to indicate that the input video is 3D and how to encode the input video. The 3D video system 200 inputs 316 the 3D metadata separately based on user input. The 3D video system 200 stores 318 the 3D metadata in an intermediate format in a 3D metadata database and stores the input video in a standard 2D video format in a video database.

Responsive to a user request for streaming the input video, the 3D video system 200 loads 320 the 3D metadata in intermediate format from the 3D video database and sends to one or more of the video streaming servers for processing or processes the metadata locally. The video streaming servers or the 3D video system 200 determines 322 the actual 3D metadata format based on the video format of the requested video, and injects 324 the requested metadata into the requested video.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as shown and described in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for injecting 3D metadata into 3D videos at video streaming herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for injecting 3D metadata into a video stream, the method comprising:

receiving a 3D input video from a client, the 3D input video having a plurality of video frames and a two-dimensional (2D) video format for storing the plurality of video frames;

extracting 3D metadata from the 3D input video, the 3D metadata describing the manner in which the video frames of the 3D input video are packed for displaying the video frames of the input video in a 3D format, wherein extracting the 3D metadata comprises determining whether the 3D input video has the 3D metadata received along with the 3D input video;

storing the plurality of video frames in the 2D video format;

storing the 3D metadata in an intermediate format separate from the plurality of video frames stored in the 2D video format, the intermediate format independent from the 3D format of the input video and the 2D video format of the input video, the intermediate format comprising an extendable data structure for describing a plurality of common settings of a plurality of 3D video formats associated with frame packing arrangements, and for storing a frame packing format of the input video in at least one of the plurality of 3D data formats; and responsive to a video streaming request for the input video:
  modifying the 3D metadata stored in the intermediate format based on actual 3D metadata of the input video, the actual 3D metadata corresponding to the 2D video format of the input video;
  inserting a data packet containing the modified 3D metadata stored in the intermediate format into a video stream of the input video; and
  streaming the input video with the modified 3D metadata.

2. The method of claim 1, wherein the extracted 3D metadata from the 3D input video comprises information describing displaying a video scene of the input video in a 3D format, the information comprising at least one of the following:
  frame packing format of the video frames representing the video scene of the input video;
  frame distance between a viewer's eyes when displaying the video scene; and
  camera settings used to capture the video scene.

3. The method of claim 1, wherein extracting the 3D metadata further comprises:
  responsive to the input video not having 3D metadata:
    receiving instructions from the client on how to play back the input video in a 3D format;
    generating 3D metadata for the input video based on the instructions;
    storing the generated 3D metadata in an intermediate format; and
    storing the video frames of the input video in a 2D video format.

4. A non-transitory computer-readable storage medium storing executable computer program instructions to inject 3D metadata of a video stream, the instructions when executed by a processor causing the processor to:
  receive a 3D input video from a client, the 3D input video having a plurality of video frames and a two-dimensional (2D) video format for storing the plurality of video frames;
  extract 3D metadata from the 3D input video, the 3D metadata describing the manner in which the video frames of the 3D input video are packed for displaying the video frames of the input video in a 3D format, wherein extracting the 3D metadata comprises determining whether the 3D input video has the 3D metadata received along with the 3D input video;
  store the plurality of video frames in the 2D video format;
  store the 3D metadata in an intermediate format separate from the plurality of video frames stored in the 2D video format, the intermediate format of the 3D metadata being independent from the 3D format of the input video and the 2D video format of the input video, the intermediate format comprising an extendable data structure for describing a plurality of common settings of a plurality of 3D video formats associated with frame packing arrangements, and for storing a frame packing format of the input video in at least one of the plurality of 3D data formats; and
  responsive to a video streaming request of the input video:
    modify the 3D metadata stored in the intermediate format based on actual 3D metadata of the input video, the actual 3D metadata corresponding to the 2D video format of the input video;
    insert a data packet containing the modified 3D metadata stored in the intermediate format into a video stream of the input video; and
    stream the input video with the modified 3D metadata.

5. The computer-readable storage medium of claim 4, wherein the extracted 3D metadata from the 3D input video comprises information describing displaying a video scene of the input video in a 3D format, the information comprising at least one of the following:
  frame packing format of the video frames representing the video scene of the input video;
  frame distance between a viewer's eyes when displaying the video scene; and
  camera settings used to capture the video scene.

6. The computer-readable storage medium of claim 4, wherein the instructions to extract the 3D metadata further comprise instructions that when executed cause the processor to:
  responsive to the input video not having 3D metadata:
    receive instructions from the client on how to play back the input video in a 3D format;
    generate 3D metadata for the input video based on the instructions;
    store the generated 3D metadata in an intermediate format; and
    store the video frames of the input video in a 2D video format.

7. A computer system for injecting 3D metadata of a video stream, the system comprising:
  a processor for executing computer program instructions; and
  a non-transitory computer-readable storage medium storing executable computer program instructions, the instructions when executed by the processor cause the processor to:
  receive a 3D input video from a client, the 3D input video having a plurality of video frames and a two-dimensional (2D) video format for storing the plurality of video frames;
  extract 3D metadata from the 3D input video, the 3D metadata describing the manner in which the video frames of the 3D input video are packed for displaying the video frames of the input video in a 3D format, wherein extracting the 3D metadata comprises determining whether the 3D input video has the 3D metadata received along with the 3D input video;
  store the plurality of video frames in the 2D video format;
  store the 3D metadata in an intermediate format separate from the plurality of video frames stored in the 2D video format, the intermediate format of the 3D metadata being independent from the 3D format of the input video and the 2D video format of the input video, the intermediate format comprising an extendable data structure for describing a plurality of common settings of a plurality of 3D video formats associated with frame packing arrangements, and for storing a frame packing format of the input video in at least one of the plurality of 3D data formats; and
  responsive to a video streaming request of the input video:
    modify the 3D metadata stored in the intermediate format based on actual 3D metadata of the input video, the actual 3D metadata corresponding to the 2D video format of the input video; and
    insert a data packet containing the modified 3D metadata stored in the intermediate format into a video stream of the input video; and streaming the input video with the modified 3D metadata.

8. The system of claim 7, wherein the extracted 3D metadata from the 3D input video comprises information describing displaying a video scene of the input video in a 3D format, the information comprising at least one of the following:
- frame packing format of the video frames representing the video scene of the input video;
- frame distance between a viewer's eyes when displaying the video scene; and
- camera settings used to capture the video scene.

9. The system of claim 7, wherein extracting the 3D metadata further comprises:
- responsive to the input video not having 3D metadata:
  - receiving instructions from the client on how to play back the input video in a 3D format;
  - generating 3D metadata for the input video based on the instructions;
  - storing the generated 3D metadata in an intermediate format; and
  - storing the video frames of the input video in a 2D video format.

* * * * *